March 24, 1970 — G. O. WESTERLUND — 3,502,443
CHLORINE DIOXIDE GENERATOR

Filed Oct. 6, 1966 — 2 Sheets-Sheet 1

United States Patent Office 3,502,443
Patented Mar. 24, 1970

3,502,443
CHLORINE DIOXIDE GENERATOR
Gothe O. Westerlund, Vancouver, Canada, assignor to Chemech Engineering Ltd., Vancouver, British Columbia, Canada, a corporation of British Columbia
Filed Oct. 6, 1966, Ser. No. 584,736
Claims priority, application Canada, Sept. 6, 1966, 969,582
Int. Cl. B01j 7/02
U.S. Cl. 23—282
15 Claims

ABSTRACT OF THE DISCLOSURE

A chlorine dioxide generator comprising in combination a vertically disposed primary reactor, combined liquor circulating and material feed means attached thereto, a vertically disposed secondary reactor connected near its lower end to said primary reactor, gas collecting means at the top of each reactor, a gas outlet from each gas collecting means, and liquor outlet means from the secondary reactor. Each of the reactors has an upper gas outlet zone which is provided with a frangible explosion cover. The liquor outlet means from the secondary reactor includes a liquor seal.

---

Figure 1:
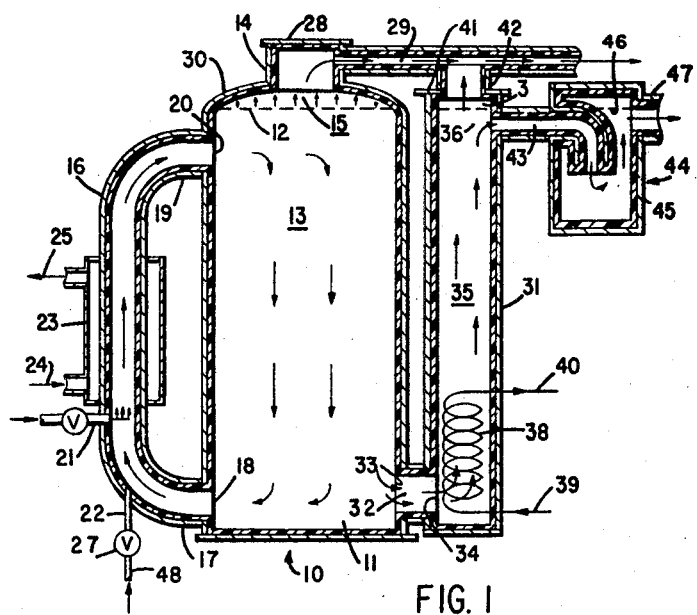

This invention relates to a chlorine dioxide generator, and more particularly, to a novel apparatus for the production of chlorine dioxide. It also relates to a novel method for carrying out a reaction for the preparation of chlorine dioxide.

Chlorine dioxide has been prepared by treating chlorates with sulphuric acid or with mixtures of sulphuric acid and an inorganic or an organic reducing agent. One such example is the salt-reduction process which employs chlorate solution, sulphuric acid and chloride solution and generates at least one mole of chlorine for every two moles of chlorine dioxide. Canadian Patents which issued for variants of this process include: 408,129 issued Oct. 20, 1942 to George Paul Vincent; 412,512 issued May 18, 1943 to Cyril Harry Evans; 452,351 issued Nov. 2, 1948 to Harry N. Tatomer; and 543,589 issued July 16, 1957 to William H. Rapson.

Processes using a metallic chlorate and mixtures of a strong mineral acid and reducing agents such as sulphur dioxide, chromic acid, nitrogen peroxide, alcohols and aldehyde yield chlorine dioxide with lower chlorine concentrations. Canadian Patent No. 533,803 issued Nov. 27, 1956 to Francis H. Dole uses sulphur dioxide in a mixture of a sulphuric acid and sodium chlorate solution. Another example is Henry C. Marks et al., U.S. Patent No. 2,616,792 issued Apr. 1, 1949 which uses an excess of nitrogen peroxide on chlorate solution. Still another example is S. H. Persson's Canadian Patent No. 438,316 issued Dec. 3, 1946 uses chromic sulphate on an acidified chlorate solution. Another example is Max L. Audoynaud's Canadian Patent No. 512,954 issued May 17, 1955 which produces a chlorine dioxide by blowing air or inert gas through a porous member into an acid solution of chlorate.

It is also well known that hydrochloric acid and chloric acid may be reacted to produce gaseous mixtures of chlorine dioxide and chlorine. Examples of patents directed to variants of this procedure include: Canadian Patent No. 408,129 issued Oct. 20, 1942 to George Paul Vincent; Canadian Patent No. 461,586 issued Dec. 6, 1949 to George A. Day; and U.S. Patent No. 2,664,341 issued Dec. 29, 1953 to E. E. Kesting. In practice these reactions are carried out by treating aqueous mixtures of water soluble chlorides such as may be obtained for example by chlorinating lime or by the electrolysis of salt, with an excess of a strong inorganic acid, such as hydrochloric acid or sulphuric acid. The following equations represent these reactions:

(1) $2NaClO_3 + 4HCl = 2ClO_2 + Cl_2 + 2NaCl + 2H_2O$ (2) $2NaClO_3 + 12HCl = 6Cl_2 + 2NaCl + 6H_2O$

Ordinarily reaction (2) is predominant over reaction (1) and the yield in chlorine dioxide is correspondingly low.

To minimize reaction (2) it has been suggested to react properly proportioned mixtures of chlorates, chlorides and a strong inorganic acid in dilute solutions (containing at least 50% and preferably up to 75% of water) at temperatures below 60° C. Based on reaction (1), equivalent ratios of $Cl^-/ClO_3^- = 2$ and of $H^+/ClO_3^- = 2$ should give high yields of $ClO_2$ per mol of chlorate decomposed. But in practice it has been proposed in particular to use a ratio of $H^+/ClO_3^-$ in excess of 2 because reaction (2) uses some of the chlorate in production of chlorine instead of $ClO_2$. This proposal results in the use of excessive quantities of acid.

Furthermore, it has been recognized that a high yield of $ClO_2$ per mol of chlorate decomposed, while desirable, is not alone sufficient to make the process economical for large scale production of chlorine dioxide. As a matter of practical necessity, it has therefore been recommended that the decomposition of the chlorate initially present be carried substantially to completion to avoid any appreciable waste of this valuable raw material. However, the requirement of consuming all, or almost all, of the chlorate entails inherent difficulties which greatly decrease the efficiency, rapidity and therefore the economy of the older process. One difficulty is the fact that the average hourly output of $ClO_2$ is necessarily low because the reaction rate decreases considerably as the concentration of the reactants, particularly of chlorate, decreases. The use of solutions of low chlorate content further magnifies this effect and wastes valuable space in the reaction chamber. Finally, as the concentration of chlorate decreases, reaction (2) contributes increasingly to the decomposition of the chlorate whereby the overall yield of chlorine dioxide is lowered.

Another process involves reacting solutions of chlorates with hydrochloric acid, the acid being supplied in amount substantially less than the equivalent stoichiometric ratio of $H^+/ClO_3^- = 2$ of reaction (1), thereby decomposing at any one time only a fraction of the available chlorate, said decomposition thus proceeding at a particularly rapid rate; enriching the chlorate content of the partially spent solution, as for example by feeding it to an electrolytic chlorate cell, returning the fortified solution to the reaction chamber to treat it again with a stoichiometrically insufficient amount of acid; and repeating this cycle, whereby substantially all the chlorate supplied is eventually efficiently decomposed, producing mixtures of chlorine dioxide and chlorine containing high proportions of chlorine dioxide.

Various types of apparatus for the production of chlorine dioxide by the above noted processes have also been described in the prior art. Typically, the chlorine dioxide generators of the prior art comprise essentially, a single long cylindrical vessel or column with one or more inlets at or near one end for reactants and an outlet at the top for removal of gases.

In Canadian Patent No. 443,856, issued Aug. 26, 1947 to Petroe, there is described a chlorine dioxide generator comprising one or more reaction chambers adapted to be charged with a solid chlorite and to the passage of an admixture of chlorine gas and air in contact with the chlorite in said chamber. The reaction chamber (or each chamber in a series of reaction chambers) being provided with an inlet for the chlorine-air mixture, an outlet for the effluent gases, and means to ensure that the ratio of chlorine to air is at a certain predetermined value.

In Canadian Patent No. 466,815 issued July 5, 1950 to Rapson et al., apparatus designed for a continuous process for producing chlorine dioxide by the reaction of $SO_2$ and a metallic chlorate is described; this comprises a reaction tower or column packed with Raschig rings or other suitable packing material and provided with an inlet at the top though which concentrated chlorate solution is fed, an inlet at the bottom through which sulphur dioxide is fed, an outlet with a valve at the extreme lower end for withdrawal of accumulated liquids, and an outlet at the top for effluent gases, and is surrounded with a water jacket. Chlorine dioxide is formed upon countercurrent contact of the reactants therein.

In the hereinbefore referred to U.S. Patent No. 2,664,341 issued Dec. 29, 1953 to E. E. Kesting, there is described an apparatus for the production of chlorine dioxide in which a series of vessels are arranged for cascade flow.

Canadian Patent No. 513,079, which issued May 24, 1955 to Evans, describes apparatus adapted for chlorine dioxide production comprising a primary tubular chamber having its longitudinal axis slightly inclined to the horizontal, separate inlet pipes for admission of liquid reactants extending from above into the upper portion of this inclined primary chamber at a substantial distance from the upper end thereof, an outlet for gas at the upper end of the primary chamber, a secondary substantially vertical tubular chamber connected at its upper end to the lower end of the primary chamber, the secondary chamber containing a bed of inert packing material in the upper portion thereof and containing heating coils in the lower portion thereof, and an inlet for inert gas and an outlet for reaction liquor at the lower end of the lower portion of the secondary chamber.

Canadian Patent No. 420,885, which issued June 20, 1944, to Evans, describes a generator for chlorine dioxide, in the form of a shallow tray having a slightly concave surface upon which is formed an extended spiral course for the passage of liquid reactants (e.g., a chlorate solution and an acid), the tray being closed by a domed cover having a lateral inlet fitting for entry of the chlorate solution and of the acid and a central outlet fitting for the discharge of gases, and the generator having an outlet for effluent liquor at a point remote from the inlets for the reactants. This apparatus is designed for the simultaneous production of chlorine dioxide and nitric oxide.

Other chlorine dioxide generators employing modifications of a cylindrical reaction column are described in Canadian Patents Nos. 534,144 issued Dec. 4, 1956 to Marks et al.; 499,846 issued Feb. 9, 1954 to Wayman et al.; and 546,251 issued Sept. 17, 1957 to J. C. Hesson.

The chlorine dioxide generators known in the art generally suffer from the drawbacks of being complicated in design and cumbersome and costly to operate, or of being relatively inefficient in operation. On the other hand, while a known chlorine dioxide generator might be relatively simple in design and efficient in operation, it may be adapted only to one specific process for producing chlorine dioxide.

An object of one aspect of the present invention is the provision of a novel chlorine dioxide generator which is simple in design and efficient in operation.

An object of a further aspect of this invention is the provision of a chlorine dioxide generator which is adapted to any process for the production of chlorine dioxide.

Briefly, the chlorine dioxide generator of one aspect of this invention comprises a primary reaction chamber, a liquor recirculating and material feed leg attached thereto, a gas zone chamber, a secondary reactor chamber, gas outlets from the gas zones in the primary and secondary reactors, and an outlet for effluent liquor only.

As a broad aspect of this invention, therefore, there is provided a chlorine dioxide generator comprising in combination a vertically disposed primary reactor, combined liquor circulating and material feed means attached thereto, a vertically disposed secondary reactor connected near its lower end to said primary reactor, gas collecting means at the top of each of said primary reactor and said secondary reactor, a gas outlet from each of said gas collecting means, and outlet means from said secondary reactor, said outlet means preferably including a liquor seal for effluent liquor.

By another broad aspect a method for conducting a chemical reaction is provided which comprises: (a) continuously feeding reactants to an inlet and recirculation zone; (b) continuously circulating a major portion of said reactants within a primary reaction zone while simultaneously withdrawing gaseous products of reaction from said zone; (c) continuously withdrawing a minor portion of said reactants from said primary reaction zone, said minor portion being substantially equal to the amount of said reactants fed to said inlet and recirculation zone; (d) continuously passing said withdrawn minor portion of reactants through a secondary reaction zone, the temperature in said secondary reaction zone being higher than the temperature in said primary reaction zone; (e) continuously withdrawing gaseous products of reaction from said secondary reaction zone; and (f) continuously withdrawing effluent liquor from said secondary reaction zone.

As a more specific aspect of this invention there is provided a chlorine dioxide generator comprising in combination a vertically disposed primary reactor, the main portion of which comprises a reaction zone wherein chlorine dioxide is formed and the remainder of which comprises a first gas zone for separation and collection of gases resulting from the reaction producing chlorine dioxide, said first gas zone being at the top of said primary reactor above the level of the liquor in the reaction zone therein; a liquor recirculating and material feed leg in the form of a half loop, one end of said leg being connected to the primary reactor, either at the bottom, or on a side wall near the bottom of said reactor and the other end of said leg being connected to said primary reactor at a location near the top of the reaction zone therein; a vertically disposed secondary reactor the main portion of which comprises a further reaction zone and the remainder of which comprises a second gas zone for separation and collection of gases, said second gas zone being located at the top of the secondary reactor, above the level of liquor in the reaction zone therein, said secondary reactor being located adjacent said primary reactor and optionally being equipped with heating means, and said secondary reactor being connected to said primary reactor by means of a liquor conduit extending outwardly from said primary reactor at a location near the bottom thereof and on the side thereof remote from said liquor recirculating and material feed leg, thereby to link with said secondary reactor at a point near the bottom thereof; a gas outlet for each of said first and second gas zones; and a liquor outlet extending outwardly from the secondary reactor at a location near the top of the reaction zone therein, said outlet having incorporated therein a liquor seal for the prevention of discharge of gases with effluent liquor.

The accompanying drawing is a diagrammatic representation of a preferred form of the chlorine dioxide generating apparatus.

As shown in the drawing, the reactor 10 includes a primary reactor chamber 11 in the form of a relatively large vertical reaction chamber, the greater portion of which is adapted to be filled with liquor to a normal liquor level 12 to provide a liquor zone 13. The primary reactor 11 is provided with a reduced cross-sectional area cap 14 to provide a gas zone 15 above the liquor zone 13 wherein gases separating from the liquor zone 13 collect. Attached to primary reactor 11 forming an integral part of the chlorine dioxide generator 10 is a liquor recirculating and material feed leg 16, which is conveniently in the form of a half loop with one end thereof 17 being connected to an aperture 18 in the primary reactor chamber 11 near the bottom of said chamber, and the other end thereof 19 being connected to an aperture 20 in the primary reactor chamber 11 at a point near the top of the liquor zone 13 therein. The liquor recirculating and material feed leg 16 is provided with inlet means 21 for chlorate feed solution and 22 for the reducing agent and dilutent gas, namely, the reactants which produces chlorine dioxide. The liquor recirculating and material feed leg 16 is optionally provided with means for controlling reaction temperatures therein. This is shown in the drawing as a cooling water jacket 23, including water inlet means 24 and water outlet means 25, but such means may be any such means known to those skilled in the art, such as, for example, heat exchanger coils. Inlet lines 21 and 22 to liquor recirculating and material feed leg 16 are provided with check valves designated as 26 and 27 respectively.

Gas zone 15 at the top of primary reactor 11 is provided with a frangible explosion cover 28 and with a gas outlet 29 for transfer of gases to a scrubber (not shown). As indicated in the drawing, the gas zone 15 may enclose in part the area bounded on the lower side by the upper surface 12 of the liquor in reactor chamber 11 and by a dished head 30 of primary reactor 11. While the head of primary reactor 11 is shown dished, it is also within the ambit of the present invention to have it straight, as this would provide for a larger area for the gas zone 15, and in particular, for a larger explosion cover 28, thereby further minimizing the hazard of explosion.

The chlorine dioxide generator of this invention 10 also includes a secondary reactor 31 which comprises an upright cylindrical chamber of relatively great height-to-diameter ratio, and is arranged adjacent to and generally parallel with primary reactor 11 and is connected thereto by liquor conduit 32, between aperture 33 near the bottom of primary reactor 11 and aperture 34 near the bottom of secondary reactor 31. Conduit 32 extends outwardly from primary reactor 11 on the side opposite from that to which recirculating and material feed leg 16 is connected. Secondary reactor 31 is divided into two zones: a secondary reaction zone 35 adapted to be filled with liquor to a liquor level 36 and which occupies most of the secondary reactor 31, and a second gas zone 37 at the top of secondary reactor 31. Secondary reactor 31 is also equipped with suitable heating means in the lower portion thereof, such as heating coils 38, through which steam is passed via inlet line 39 and outlet line 40. The second gas zone 37 is provided with a frangible explosion cover 41, similar to frangible explosion cover 28 over the top of primary reactor 11, and with a gas outlet conduit 42, which may be joined (as shown in the drawing) with gas outlet conduit 29 for transfer of gases to a scrubber.

Figure 2:
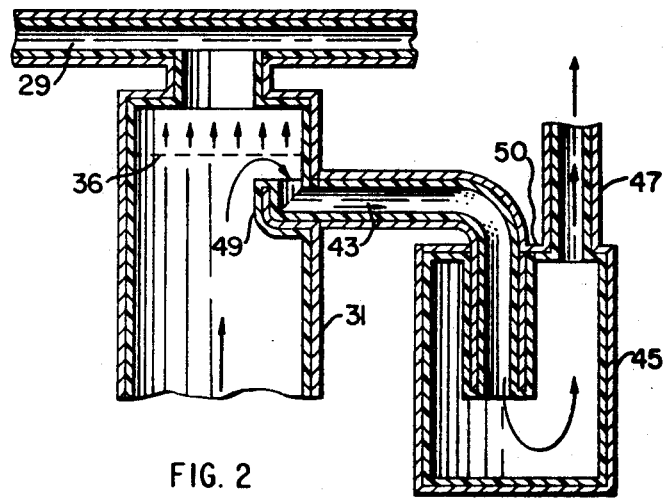

Extending outwardly from secondary reactor 31 near the top of the liquor zone 35 therein is a liquor outlet 43 for the discharge of effluent liquor. It is desirable to design the outlet 43 for a low velocity discharge in order to avoid the carrying over of entrained gas bubbles. Alternatively, as shown in FIG. 2, a skirt or weir 49 may be provided in secondary reactor 31 near the inlet to liquor outlet 43 to prevent the liquor from flowing directly to outlet 43. Instead, the liquor must flow over the weir 49 which induces gas-liquor separation, prior to the liquor being discharged through outlet 43. This liquor outlet preferably includes a liquor seal generally indicated at 44, which serves to prevent discharge of gases with the effluent liquor. Liquor seal 44 includes a main chamber 45 adapted to be filled with liquor to a liquor level 46. Outlet conduit 43 is elbow shaped to discharge to the bottom of chamber 45. Effluent liquor follows a sinusoidal path to liquor effluent 47.

Alternatively, as shown in FIG. 2 the main chamber 45 may be so disposed with respect to the secondary reactor chamber 31 that the liquor outlet 43 enters through the roof 50. The effluent nozzle 47 also is connected to the roof 50. This tends to eliminate the gas entrapment over the liquor level 46 in chamber 45 as shown in FIG. 1.

If desired, the first gas zone 15 and the second gas zone 37 of this chlorine dioxide generator 10 could be filled with packing materials. This would serve to increase the surface area and minimize hazards from explosions.

The material out of which the chlorine dioxide generator of one aspect of this invention may be constructed may be any material conventionally used for construction of chemical process apparatus normally in contact with highly corrosive media. Such material may be, for example, polyester glass reinforced construction, or steel-lined, glass-lined, lead-lined or titanium-lined or solid titanium, equipment.

The chlorine dioxide generator in accordance with one aspect of this invention may be employed for any process such as heretofore described for the production of chlorine dioxide. More specifically, it may be employed for the process as set out in this applicant's Canadian application Ser. No. 906,199, filed on June 30, 1964.

The processes described in the aforementioned patent application provide for the manufacture of chlorine dioxide is based on following main reactions: (M=metallic)

(1) $2MCl + 6H_2O + 12 \text{ FARADAYS} \rightarrow 2MClO_3 + 6H_2$ (2) $2H_2 + 2Cl_2 \rightarrow 4HCl$ (3) $2MClO_3 + 2HCl \rightarrow 2MCl + 2HClO_3$ (4) $2HClO_3 + 2HCl \rightarrow 2ClO_2 + Cl_2 + 2H_2O$ The system is balanced as follows:

(5) 

The action of hydrogen chloride on the metallic chlorate solution will produce chlorine dioxide and chlorine according to reactions (3) and (4). By controlling acidity and utilizing an excess of the metallic chlorate, reaction (3) and (4) can be caused to yield $ClO_2:Cl_2$ in ratio 2:1. Chlorine is consumed in reaction (2) for production of hydrogen chloride, thus, the system will yield chlorine dioxide only, free of chlorine to the extent of the efficiency of chlorine dioxide gas separator. Since the system is closed, after the initial charge of metallic chloride, no addition of salt is required. Furthermore, the electrolysis in reaction (1) will produce 3 times the required amount of hydrogen. Such process is thus based on a system which requires water, chlorine and electric current for the production of chlorine dioxide. Hydrogen is the only by-product.

The chlorine dioxide generator of this aspect of this invention provides internal recirculation of the reaction liquor in the primary reactor 11. This is accomplished by feeding dilutent gas into the liquor leg 16 through a suitable line, such as line 48 which leads via valve 27 to line 22 thereinto. The passage of dilutent gas into the recirculating leg 16 lowers the density of the liquor therein and thus creates a flow of liquor downwardly through the primary reactor 11 and upwardly through recirculating and material feed leg 16 as indicated by the arrows in the drawing. In addition, an induced upward flow of liquor in recirculating and material feed leg 16 is caused by the friction between gas and liquor when the gas bubbles rise. A preferred dilutent gas for use in the operation of this apparatus is chlorine gas or a mixture of hydrogen and carbon dioxide. However, as will be apparent to anyone skilled in the art, air or any other suitable gas may be employed for this purpose.

The reducing agent is mixed with the liquor in the recirculating stream in recirculating leg 16, via line 22. A preferred reducing agent is hydrogen chloride, but any suitable reducing agent may be used. As indicated in the drawing, the reducing agent may be supplied to the recirculating liquor stream by means of the same line as that used to feed dilutent gas into the stream of liquor; i.e., line 48. It is found that by feeding reducing agent into the recirculating liquor in the reactor in this way, local high concentrations of reducing agent and resultant localized expressively high temperatures are avoided.

Fresh chlorate feed solution is also added to the recirculating liquor stream in the leg, as by line 21. This will insure proper mixing and contact with reducing agent, resulting in fast reaction rate, better controlled reactions and temperature, as well as minimizing the required equipment size. If desirable the reaction temperature can be controlled by mantling recirculation leg 16, such as by water jacket 23, (which may be supplied either with hot water or with cool water) or by employing heat exchanger coils. The high rate of liquor circulating improves the heat transfer by minimizing the effect of the liquor film coefficient.

The rate of recirculation of liquor through the recirculation leg 16 of the reactor 10 is determined by the area of cross section of the recirculation leg, the height and shape of the leg, the amount of dilutent gas supplied to the recirculating stream and the relative densities of gas versus liquor. The gases may be injected or dispersed in bubbles and the method employed will affect the rate of recirculating. The amount of chlorine dioxide and net heat produced in the recirculation leg 16 will increase the flow rate of liquor through the leg.

Primary reactor 11 serves as a retention for continuation of the chlorine dioxide producing reactions in the system under less agitated conditions, and for the provision of a gas zone, designated as 15 in the drawing for separation of gases from the liquor. The liquor surface area therein should be large enough to facilitate the gas separation without causing excessive foaming. The gases collected in gas zone 15 are drawn off through gas outlet 29 to a scrubber (not shown).

A portion of the liquor in liquor zone 13 of the primary reactor chamber after recirculation through the primary reactor 11 and recirculating leg 16 (during which a substantial amount of the chlorine dioxide and chlorine produced in the reaction is formed and separated from the liquor), passes out of primary reactor 11 through conduit 32 into secondary reactor 31 which may optionally be equipped with heating coils (e.g. coils 38) or other means for raising the temperature. The heating of the reaction mixture in the secondary reactor 31 will further force the reaction towards chlorine dioxide and chlorine formation, thus weakening effluent liquor as well as more completely utilizing the added reducing agent. The additional gases formed in liquor zone 35 of secondary reactor 31 collect in a second gas zone 37 at the top of secondary reactor 31, and are subsequently drawn off through a gas outlet 42 to mingle with the gases drawn off from the first gas zone 15 in outlet conduit 29.

After completion of the reaction in the secondary reactor, the spent effluent liquor flows out of said secondary reactor through a liquor outlet 43. This liquor outlet is equipped with a liquor seal (designated at 45 in the drawing) which serves to prevent discharge of gases with the effluent liquor.

It will be noted that a major volume of the liquor in the primary reactor is subjected to recycle through the recirculating and material feed leg 16. The amount of recycled liquor is generally within the ratio of 0.1 to 10 of chlorate feed rate, preferably higher, but this will depend upon cost of power for achieving the lift versus the improvement in efficiency.

In actual practice the flow rate through the primary reactor will be from 0.02 to 1 ft./minute, preferably 0.05 to 0.2 ft./minute.

The flow through the secondary reactor is generally 0.02 to 2 ft./minute, preferably 0.02 to 0.2 ft./minute.

The rate of addition of chlorate feed solution to the recirculating and material feed leg is generally 1 to 100 ft./minute, preferably 5 to 40 ft./minute.

The rate of addition of the reducing agent to the recirculating and material feed leg 16 is determined by chlorate feed rate and the desired production output of chlorine dioxide; e.g., employing hydrogen chloride, for each mole of $ClO_2$ at least two moles of HCl is required.

The rate of addition of the dilutent gas is proportion to the production of $ClO_2$ and the velocity of gases in the leg is designed to give the desired recycling of liquor.

The gases withdrawn from zones 15 and 37 generally consist of 3% to 15% $ClO_2$, preferably 5 to 10%.

The temperature of the liquor in the primary reactor 11 is 30 to 80° C., preferably 35 to 50° C. This may be controlled by means of jacket 23 around recirculating and material feed leg 16.

The temperature of the liquor in the secondary reactor 31 is generally 0 to 60° C. higher than in the primary reactor 11, preferably from 0 to 20° C., depending on cost and availability of steam and subsequent heat removal system. This temperature rise may be achieved by steam heating coil 38.

In summary, the present invention provides in one aspect a chlorine dioxide generator which is relatively simple to design and construct and which is efficient and economical in operation. The apparatus is particularly adapted for use in a continuous recyclic process for the production of chloride dioxide, such as that described in copending Canadian application Ser. No. 906,199, filed June 30, 1964.

In another of its aspects it provides a method for conducting the chemical reactions which result in the production of chlorine dioxide. Such method is, however, applicable to any reaction where one of the products is gaseous. The method may be applied to any of the previously described processes for producing chlorine dioxide.

I claim:
1. A unitary reaction apparatus comprising, in combination:
   (A) a vertically disposed, primary reactor, said primary reactor including:
      (i) an upper, inflow liquor recirculatory zone adjacent the top thereof,
      (ii) a lower, outflow, liquor recirculatory zone adjacent the bottom thereof,
      (iii) a lower liquor outlet zone, and
      (iv) an upper gas outlet zone;
      said primary reactor being for carrying out at least an initial part of a designated chemical reaction, said gas zone (iv) being provided with a frangible explosion cover;
   (B) a combined liquor circulating and fresh reactant feed means attached thereto and communicating between said upper liquor recirculatory zone (A) (i) and said lower liquor recirculatory zone (A) (ii);
   (C) a vertically disposed secondary reactor, said secondary reactor including:
      (v) a lower liquor inlet zone,
      (vi) an upper liquor outlet zone, and
      (vii) an upper gas outlet zone, said gas zone (C) (vii) being provided with a frangible explosion cover;
      said secondary reactor being attached to said primary reactor and communicating therewith by means of a connection from said lower liquor outlet zone (A) (ii) of said primary reactor to said lower liquor inlet zone (C) (v) of said secondary reactor, said secondary reactor being for carrying out at least a terminal part of said designated chemical reaction;
   (D) a primary gas collection zone adjacent said gas outlet zone (A) (iv) of the primary reactor, said primary gas collection zone leading to said gas outlet zone (A) (iv);

(E) gas withdrawal and collection means connected to said upper gas outlet zone (A) (iv);

(F) a secondary gas collection zone adjacent said gas outlet zone (C) (vii) of the secondary reactor, said secondary gas collection zone leading to said gas outlet zone (C) (vii);

(G) gas withdrawal and collection means connected to said upper gas outlet zone (C) (vii); and (H) liquor outlet means, connected to said upper liquor outlet zone (C) (vi) for withdrawal and collection of liquor, but not of gases, from the unitary reaction vessel.

2. The unitary reaction apparatus of claim 1 wherein said outlet means (H) from said secondary reactor is provided with an upwardly projecting skirt for intercepting and directing flow of liquor from said secondary reactor.

3. The unitary reaction apparatus of claim 1 wherein said gas zones (D) and (F) are filled with packing materials to increase surface area therein and to minimize hazards from explosions.

4. The unitary reaction apparatus of claim 1 wherein the primary reactor (A) is provided with a straight head and said frangible explosion cover is of relatively large surface area.

5. The unitary reaction apparatus of claim 1 wherein:
   (aa) said primary reactor (A) has a predetermined cross-sectional area;
   (bb) said means (B) includes feed inlet means for directly feeding reactants thereto, said means (B) having a cross-sectional area substantially less than that of said primary reactor (A);
   (cc) said secondary reactor (C) is provided with heating means near the bottom thereof, said reactor (C) having a cross-sectional area less than that of said reactor (A) but greater than that of means (B);
   (dd) said gas withdrawal means (E) and said gas withdrawal means (G) being interconnected; and
   (ee) said liquor outlet means (H) comprising a gas trap to permit only spent liquor, but not product gases, to be withdrawn.

6. The unitary reaction apparatus of claim 1 wherein:
   (a) said upper gas outlet zone (A) (iv) constitutes a minor portion of said primary reactor;
   (b) said means (B) constitutes a leg in the form of a half loop, one end of said leg being connected to upper zone (A) (i), the other end of said leg being connected to said lower zone (A) (ii);
   (c) said upper gas outlet zone (C) (vii) constitutes a minor portion of said secondary reactor;
   (d) said secondary reactor including heating means therein;
   (e) said liquor outlet zone (A) (iii) being disposed remote from said lower zone (A) (ii); and
   (f) said liquor outlet means (H) having incorporated therein a liquor seal for the prevention of the discharge of gases along with effluent liquor.

7. The unitary reaction apparatus of claim 6 wherein the heating means (d) in said secondary reactor (c) is a heating coil through which steam is adapted to be passed.

8. The unitary reaction apparatus of claim 1 wherein said liquor circulating means (B) includes first means for supplying dilutent gas and reducing agent thereto and second means for supplying chlorate feed solution to the liquor which is recirculating therein.

9. The unitary reaction apparatus of claim 8 wherein said liquor circulating means (B) is provided with temperature changing means for controlling the temperature of the reaction occurring within said primary reactor (A).

10. The unitary reaction apparatus of claim 9, wherein said temperature changing means comprise heat exchanger coils.

11. The unitary reaction apparatus of claim 9 wherein said temperature changing means comprise a jacket through which steam or cooling water is passed.

12. The unitary reaction apparatus of claim 1 wherein said liquor outlet means (H) includes a liquor seal for effluent liquor.

13. The unitary reaction apparatus of claim 12 wherein: said liquor seal includes a main chamber provided with an inlet conduit and an outlet conduit; wherein said inlet conduit is connected to said liquor outlet means (H) from said secondary reactor (C) by means of a downwardly depending tube, the outlet level of said tube being below the outlet level of said main chamber outlet conduit.

14. The unitary reaction apparatus of claim 13 wherein said inlet conduit and said outlet conduit are disposed in opposed side walls of said main chamber.

15. The unitary reaction apparatus of claim 13 wherein said inlet conduit and said outlet conduit are disposed in the roof of said main chamber.

References Cited

UNITED STATES PATENTS

| | | | |
|---|---|---|---|
| 1,995,343 | 3/1935 | Fleischer | 23—260 |
| 2,664,341 | 12/1953 | Kesting | 23—260 |
| 2,861,871 | 11/1958 | Germano | 23—282 XR |
| 2,880,076 | 3/1959 | Kircher et al. | 23—260 |
| 2,881,052 | 4/1959 | Julien et al. | 23—282 XR |
| 2,895,801 | 7/1959 | Northgraves et al. | 23—152 |
| 3,004,013 | 10/1961 | Kircher et al. | 23—260 XR |
| 3,222,138 | 12/1965 | Beianne et al. | 23—260 XR |

MORRIS O. WOLK, Primary Examiner

B. S. RICHMAN, Assistant Examiner

U.S. Cl. X.R.

23—152, 260